Jan. 11, 1966 R. W. EMERY 3,229,016
METHOD OF MOULDING ARTICLES ON A CORE LINER
Filed May 6, 1963 2 Sheets-Sheet 1

INVENTOR
ROY W. EMERY
BY Fetherstonhaugh & Co.
ATTORNEYS

United States Patent Office 3,229,016
Patented Jan. 11, 1966

3,229,016
METHOD OF MOULDING ARTICLES ON A CORE LINER
Roy W. Emery, 3409 Yonge St., Toronto, Ontario, Canada
Filed May 6, 1963, Ser. No. 278,264
4 Claims. (Cl. 264—313)

This invention relates to the moulding of articles having long tubular voids. More particularly, it relates to a method for applying the liner to the core mould and moulding around said liner an elongated article having a long tubular void. The general method of moulding to which the invention relates is described in United States Patent No. 3,069,744. It is characterized by the building up of a body of moulding material upon a liner that overlays a rigid core mould that forms the tubular void. According to the invention disclosed in the said patent, the liner has substantially no stretch in the longitudinal direction of the core mould when stressed by the forces of removal of the core mould from the liner after a body moulding material has been formed thereon so that, in removal of the core mould, the body of moulding material is not broken or damaged. After removal of the core mould, the liner is peeled from the body of moulding material and reused.

In Patent No. 3,069,744, the liner comprised a tubular piece of fabric that was stretched over the core mould. This was satisfactory but, since initially developing the method, an improved manner of applying the liner to the core mould has been devised. These latter forms the subject matter of this specification.

With the improvements to be described in this specification, it is easier to apply the liner to the core mould. This is a substantial advantage from the point of view of economy of operating the method of moulding.

Generally speaking, a core mould and liner for use with this method have a construction wherein the liner comprises a piece of fabric having a length commensurate with the length of the core mould and a width commensurate with the circumference of the core mould. In use, the liner is wrapped around the core mould and material is moulded thereon as described in my earlier patent. Means are carried by the core mould for maintaining the liner in wrap-around position on the core mould. The invention will be clearly understood after reference to the following detailed specification read in conjunction with the drawings.

Figure 1:
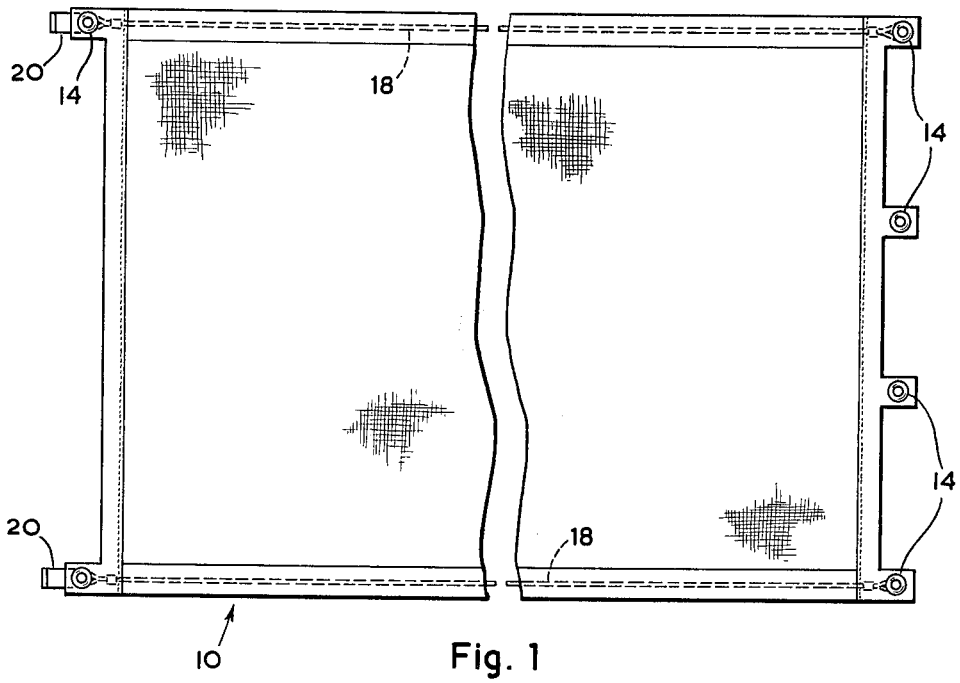
Figure 2:
Figure 4:
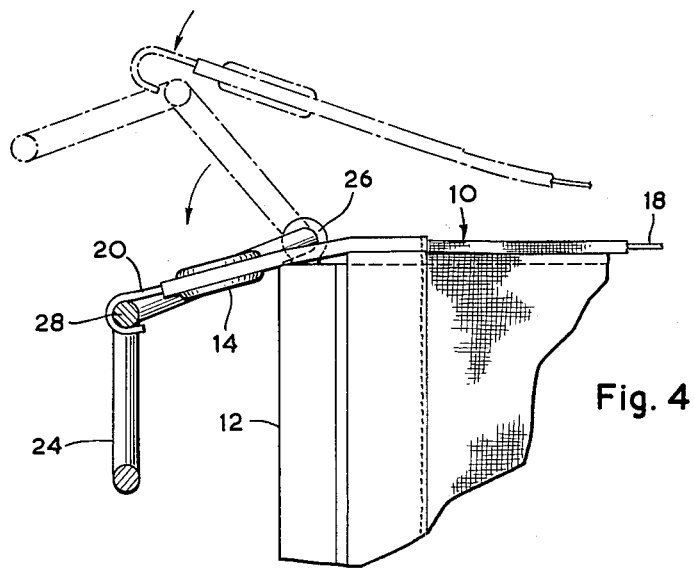
Figure 5:
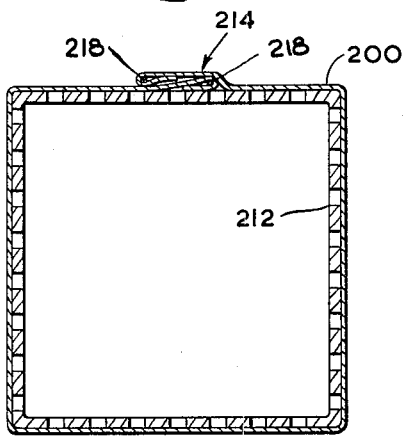
Figure 6:
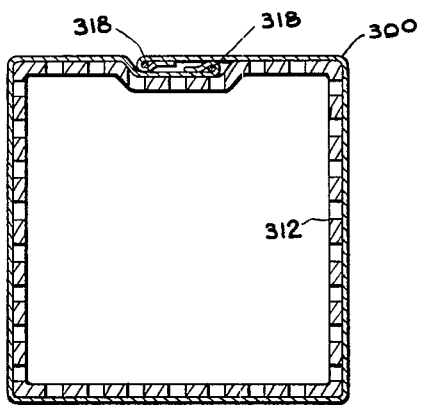

In the drawings:
FIGURE 1 is a plan view of a mould liner, broken to save space, in opened position,
FIGURE 2 is a view of a core mould having a liner wrapped therearound,
FIGURE 3 is an end view of the mould of FIGURE 2,
FIGURE 4 is a detail of the tensioning lever, and
FIGURES 5 and 6 are cross-sectional views of alternative mould-liner arrangements.

Referring to the drawings, the numeral 10 refers to a liner for the core mould 12. Core mould 12 is an elongated mould of the general type described in U.S. Patent No. 3,069,744, for the purpose of forming a tubular void in a body of moulded material that is built up on the outside thereof. Detailed reference to the core mould and to the general method of moulding will not be made in this application since the invention herein described relates to the construction of the liner and to its application to the core mould.

The liner 10 comprises a piece of fabric having a length commensurate with the length of the core mould 12 and a width commensurate with the circumference of the core mould 12 whereby it can be wrapped around the core mould to provide a liner for moulding.

Figure 3:
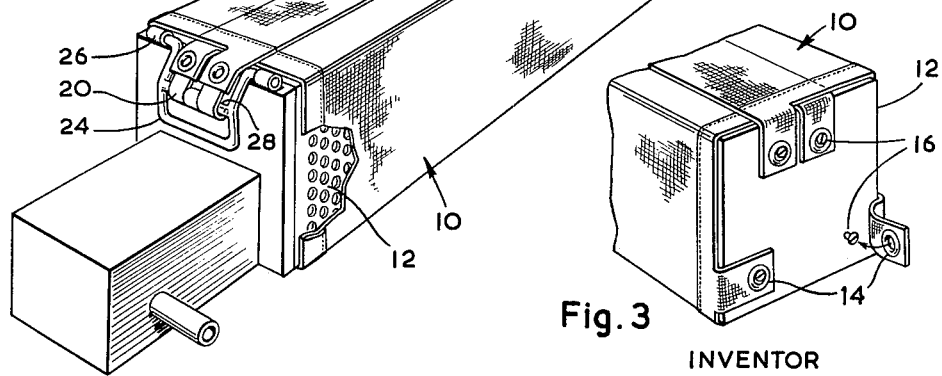

The ends of the liner 10 are each formed with a reinforcing hem and have grommets 14 at spaced-apart points for engagement with hooks, such as the hooks 16 carried by the core mould at its end shown in FIGURE 3, for the purpose of anchoring the liner 10 as it is wrapped around the core mould 12 prior to moulding.

A further important means for maintaining the liner 10 in wrap-around relation on the core mould 12 is the wires 18 carried in a hem at each longitudinal edge of the liner 10. Wires 18 are connected to corner grommets 14 at each of their free ends that are mounted in the tabs at ends of the liner. Hooks 20 connect with the grommet tabs and serve to connect the liner and wires to the tension applying lever of the mould.

The core mould has means for applying tension to the wires 18 when the liner 10 is in a wrap-around position thereon and in the embodiment of the invention shown, the tension-applying means comprises hooks 16 for engaging the corner grommets 14 at one end of the wires 18 and a stretching lever 24 at the other end of the core mould.

Lever 24 comprises a piece of metal swingably mounted to the end of the core mould as at 26 and having a bar 28 extending thereacross to which the free ends of the hooks 20 can be attached. In use, the lever is swung upwardly to carry the bar 28 in a direction towards the core mould (dotted line position, FIGURE 4). In this position, the hooks 20 can be hooked around the bar 28. As the bar 24 is swung in a downward direction, the bar 28 travels away from the end of the core mould to apply tension to the wires 18, and hence the edges of the liner, as they are stretched between hooks 16 and lever 24. The tension is a maximum when the bar 28 is substantially in the same plane as the top of the mould core and the wires 18. The limit of the movement of the lever 24 in this direction is just below the plane of the wires 18 and once the lever is pivoted to the limit of its movement in this direction below the plane of the top of the mould core and the wires 18, it tends to lock in that position due to the tension of the wires. The tension, of course, can be released by lifting the lever in upward position to move the bar 28 through the plane of the wires 18.

The amount of desirable stress in the wires 18 will, of course, vary. However, it has been determined that for a core mould having a length of about 12 feet that it is preferable to tension the wires 18 with a pressure of 50 lbs. or more. The wire, thus tensioned, should have a strength of at least 100 lbs. to avoid inadvertent breakage in applying the tension.

As indicated, the wires 18 have a predetermined amount of strength so that they can assume the correct length when applied and stretched by the stretching means of the core mould. The wire 18 must be of a material such that when subjected to changed conditions of moisture or temperature encountered in the moulding process, the length and tension within the material remains unchanged during the process. It has been found that such materials as monofilament nylon in one or more strands are suitable for short liners because they are both stretchy and strong and, at the same time, pliable and resistant to kinks and can be readily tied at the grommets. Multiple strand twisted fine steel wire cable is suitable for long liners and cores because of the limited stretch and the ability to return instantly to original length after release. On the other hand, braided soft fine Monel or iron wires are unsuitable because they tend to kink in handling and also because they tend to assume a succession of changes in both stretched and unstretched lengths in successive applications to and removal from a core mould.

In use, a mould liner, such as the mould liner 10 shown in FIGURE 1, is wrapped around a core mould, such as the core mould 12 and secured thereto by means of the hooks 16 and the tension wires 18 and clamping device 24 which operate in conjunction with hooks 20. Following this, a body of moulded material is assembled on the core mould in accordance with the method of moulding described in Patent No. 3,069,744. Following initial consolidation of the moulding material, the core mould is withdrawn from the liner in accordance with the invention described in Patent No. 3,069,744. The liner 10 is then peeled from the body of moulding material and reused with the same or different core mould.

The stretch of the wires 18 is critical. The wires 18, when anchored at 16 and to the bar 28 prior to application of tension, must have a predetermined amount of stretch that will permit the tension-applying lever 24 to be moved to the downward tension-applying position. Once this position is reached, however, the wires should resist further substantial deformation from the forces applied thereto as a result of the moulding operations of building a body of moulding material on the core mould because the purpose of the tensioned wires 18 is to maintain the edges of the liner in a closed position during the moulding operation. Thus, it is important that the wire stretch a predetermined amount and that the tensioning device 24 be adapted to stretch the wire this predetermined amount and that following stretch of the said predetermined amount, the wire should stretch not substantially further due to the forces encountered in a moulding operation so that the wires can maintain the edges of the liner 10 in a closed position.

Many modifications of the invention are possible within the basic concept of providing a sleeve that is formed from a substantially rectangular piece of fabric adapted to be wrapped around the mould. The retaining means are capable of variation. Other anchoring means around the ends of the mould, for example, could be provided and variations in the hem enclosed tension wires disclosed are possible.

In FIGURES 5 and 6, alternative tension wire arrangements are disclosed. These figures are cross-sectional views of a core mould with a liner therearound.

In FIGURE 5, the liner 200 is wrapped around a mould 212 and the longitudinal edges thereof are overlapped as indicated at 214. The tension-applying wires are indicated by numeral 218. This is the general arrangement illustrated in FIGURE 2. In some cases, it would also be possible to use only one tension wire in such an arrangement. In these cases, and where the moulding operations do not impose a large circumferential load on the liner, only the top edge of the liner need carry a tension wire because once the top wire is tensioned, the underlying edge could not move.

In FIGURE 6, a further embodiment is illustrated. In this case, the mould has a depression to accommodate the tension wires. Like numerals, except as to first digit, to those used in FIGURE 5, have been used to designate like parts.

All of these embodiments are intended to fall within the scope of this invention. There are, of course, many other embodiments. The invention is very useful for example, if one wanted to use a core mould having a longitudinally extending depression. In such a case the tension wire could be arranged to lay at the bottom of the depression.

In the specification, I have referred to the liner as having a length commensurate in scope with the length of the core mould. By this term, I merely mean that the length is, for practical purposes, long enough for the core mould. I also use the term, in connection with the liner, having a width commensurate with the circumference of the core mould. Again, this is a practical term and is intended to cover a width that will permit the liner to be butted and also to be overlapped as disclosed in FIGURES 5 and 6.

What I claim as my invention is:

1. A method of moulding articles on a core mould of the class described wherein the liner has substantially no stretch in the longitudinal direction of the core mould comprising the steps of taking a piece of fabric having a length substantially commensurate with the length of the core mould and a width commensurate with the circumference of the core mould, said fabric having substantially no stretch in its length direction and a wire carried by at least one longitudinal edge thereof, lapping said fabric around the core mould with the length of the fabric aligned with the longitudinal axis of the core mould, holding said fabric along at least one of its longitudinal edges against the core mould by stretching said wire against said core mould, moulding around said fabric an elongated article having a long tubular void, removing said core, and finally peeling off said fabric from the long tubular void of the formed elongated article.

2. A method of moulding as claimed in claim 1 in which said fabric has a wire carried by both of its longitudinal edges and in which said fabric is held as aforesaid along both of its longitudinal edges by stretching both of said wires against said core mould as aforesaid.

3. A method of moulding as claimed in claim 1 including the additional step of removably securing said fabric liner at each of its ends at spaced apart points to said core while said fabric is held against said core mould as aforesaid and prior to the forming of said elongated article.

4. A method of moulding as claimed in claim 3 in which said fabric has a wire carried by both of its longitudinal edges and in which said fabric is held as aforesaid along both of its longitudinal edges by stretching both of said wires against said core mould as aforesaid.

References Cited by the Examiner
UNITED STATES PATENTS

| | | | |
|---|---|---|---|
| 2,315,634 | 4/1943 | McCall | 25—128 |
| 2,659,124 | 11/1953 | Henry | 25—128 |
| 2,734,262 | 2/1956 | Briegel | 29—423 |
| 3,063,888 | 11/1962 | Howard et al. | 156—187 |
| 3,069,744 | 12/1962 | Emery | 264—313 |
| 3,089,805 | 5/1963 | Schmidt | 156—187 |

WHITMORE A. WILTZ, *Primary Examiner.*

MICHAEL V. BRINDISI, THOMAS H. EAGER,
*Examiners.*